(12) United States Patent
Rosser

(10) Patent No.: US 6,446,261 B1
(45) Date of Patent: Sep. 3, 2002

(54) SET TOP DEVICE FOR TARGETED ELECTRONIC INSERTION OF INDICIA INTO VIDEO

(75) Inventor: Roy J. Rosser, Princeton, NJ (US)

(73) Assignee: Princeton Video Image, Inc., Lawrenceville, NJ (US)

( * ) Notice: Subject to any disclaimer, the term of this patent is extended or adjusted under 35 U.S.C. 154(b) by 0 days.

(21) Appl. No.: 09/331,332
(22) PCT Filed: Dec. 17, 1997
(86) PCT No.: PCT/US97/23396
  § 371 (c)(1),
  (2), (4) Date: Jun. 17, 1999
(87) PCT Pub. No.: WO98/28906
  PCT Pub. Date: Jul. 2, 1998

Related U.S. Application Data

(60) Provisional application No. 06/034,517, filed on Dec. 20, 1996.

(51) Int. Cl.[7] .......................... H04N 7/10; H04N 7/025; H04N 7/20
(52) U.S. Cl. .............................. 725/34; 725/32; 725/35; 725/64
(58) Field of Search .......................... 348/1, 2, 9, 581, 348/465, 10, 12; 455/4.2, 2; 707/4; 725/2, 9, 10, 13, 45, 46, 51, 32–36, 64; 705/10–14; 709/217–219

(56) References Cited

U.S. PATENT DOCUMENTS

| | | | |
|---|---|---|---|
| 4,546,382 A | * 10/1985 | McKenna et al. | |
| 4,566,030 A | * 1/1986 | Nickerson et al. | 348/1 |
| 4,602,279 A | * 7/1986 | Freeman | 348/10 |
| 5,029,014 A | * 7/1991 | Lindstrom | 348/9 |
| 5,155,591 A | * 10/1992 | Wachob | 455/4.2 |
| 5,223,924 A | * 6/1993 | Strubbe | 455/4.2 |
| 5,264,933 A | 11/1993 | Rosser et al. | 358/183 |
| 5,323,240 A | * 6/1994 | Amano et al. | 348/1 |
| 5,382,970 A | * 1/1995 | Kiefl | 348/1 |
| 5,410,344 A | * 4/1995 | Graves et al. | 348/1 |
| 5,491,517 A | * 2/1996 | Kreitman et al. | 348/581 |
| 5,495,283 A | * 2/1996 | Cowe | 348/9 |
| 5,521,645 A | * 5/1996 | Ezaki | 348/465 |
| 5,534,911 A | * 7/1996 | Levitan | 348/1 |
| 5,543,856 A | 8/1996 | Rosser et al. | 348/578 |
| 5,579,057 A | * 11/1996 | Banker et al. | 348/10 |
| 5,617,565 A | * 4/1997 | Augenbraun et al. | 707/4 |
| 5,652,615 A | * 7/1997 | Bryant et al. | 348/9 |
| 5,724,091 A | * 3/1998 | Freeman et al. | 348/12 |
| 5,758,257 A | * 5/1998 | Herz et al. | 455/2 |
| 5,774,664 A | * 6/1998 | Hidary et al. | 348/12 |
| 5,801,747 A | * 9/1998 | Bedard | 348/1 |
| 5,872,850 A | * 2/1999 | Klein et al. | |
| 5,886,731 A | * 3/1999 | Ebisawa | 348/9 |
| 5,945,988 A | * 8/1999 | Williams et al. | |
| 6,006,257 A | * 12/1999 | Slezak | |

* cited by examiner

Primary Examiner—Andrew Faile
Assistant Examiner—Hai V. Tran
(74) Attorney, Agent, or Firm—Woodbridge & Associates, PC; Richard C. Woodbridge

(57) ABSTRACT

A method of anonymous targeted insertion of indicia into video broadcasts. Individual televisions or other video reception devices are associated with set-top boxes that monitor the usage and viewing habits of the television set or other video reception device. A viewer profile derived from data acquired from said monitoring is created wherein the viewer profile indicates certain characteristics about the viewer. This profile is transmitted to a centralized database, said centralized database being an intermediate link between the origin of the video broadcast and the end viewer. The purpose of the database is to link specific insertable indicia with matching specific viewer profiles. The insertable indicia are encoded directly into the broadcast video and re-broadcast to the end viewer where the set-top box decodes the broadcast video and performs insertion of the indicia. Thus, the system and method allow advertisers to target specific ads or indicia to specific viewing profiles.

16 Claims, 4 Drawing Sheets

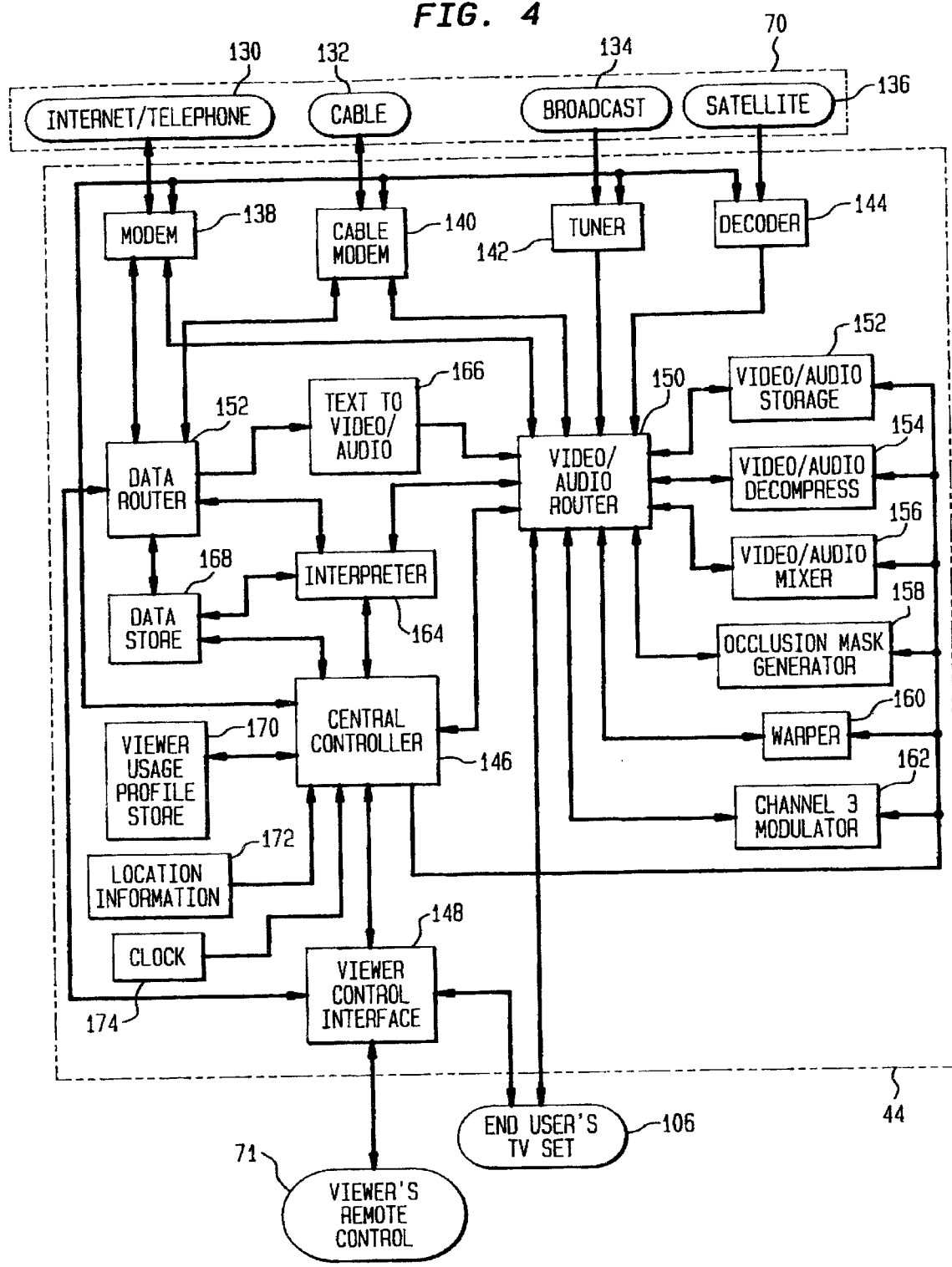

SET TOP DEVICE FOR TARGETED ELECTRONIC INSERTION OF INDICIA INTO VIDEO

CROSS-REFERENCE TO RELATED APPLICATIONS

This patent application is related to and claims the benefit of U.S. provisional application serial No. 60/034,517 filed on Dec. 20, 1996 entitled "Set Top Device for Targeted Electronic Insertion of Indicia into Video".

BACKGROUND OF THE INVENTION

1. Field of the Invention

This invention relates to set top video reception devices, and particularly, enhancing them to allow insertion of targeted indicia Into video.

2. Description of the Related Art

Electronic devices for inserting images into live video signals, such as described in U.S. Pat. No. 5,264,933 by Rosser, et al. and U.S. Pat. No. 5,491,517 by Kreitman et al., have been developed and used commercially for the purpose of inserting advertising and other indicia into video sequences, including live broadcasts of sporting events. These devices are capable of seamlessly and realistically incorporating logos or other indicia into the original video in real time, even as the original scene is zoomed, panned, or otherwise altered in size or perspective.

Live video insertion of indicia requires several steps. The event video must be recognized, tracked, and adjusted for the potential insert perspective and occluding objects prior to actual insertion. In the systems discussed in U.S. Pat. No. 5,264,933 by Rosser, et al. and U.S. Pat. No. 5,491,517 by Kreitman et al. it was assumed that the broadcaster would perform the complete process, including recognition, tracking, creating an occlusion mask, warping inserts to correctly match the current image, and correctly mixing the original video, warped insert and occlusion mask.

In U.S. Pat. No. 5,543,856 of Rosser, et al., a Live Video Insertion System (LVIS) split into two functional parts is described, with an upstream, "master" part performing recognition and occlusion mask generation, and sending this information downstream, along with various control parameters, to a less computationally endowed downstream "slave" part, capable of warping inserts to correctly match the current image, and correctly mixing the original video, warped insert and occlusion mask.

A number of current trends in television, video, and computer technology make it feasible and economically likely that a "slave" LVIS unit will be included within future set-top units. One trend is toward broadcasters sending compressed video signals directly to the home. Compression is driven by a limited availability of broadcast bandwidth, especially satellite based broadcasts. In order to decompress the compressed video, users require a set-top device that has significant computing power and memory. These set top devices are required to run decompression algorithms in real time. Memory and computing power could also be utilized to make the set-top device act as a downstream "slave" part of an LVIS system.

A second trend is the decreasing price of memory and computing power thereby increasing a personal computer's ability to process video bandwidths of information.

A third trend is the movement by telephone companies and other wire network providers to higher bandwidth networks. There is also the possibility that the World Wide Web, or some similar computer network, could become a means for large-scale data exchange or broadcast of high quality video information. Compressed video, still necessary to traverse networks with limited bandwidths, is decompressed by the personal computer receiving the data. The video processing power of the personal computer may be sufficient to also be utilized as the downstream "slave" section of an LVIS system.

Yet another trend is towards sending digital television signals directly to the home. This means that the television set itself will be a digital processor, potentially powerful enough to be programmed and used for the Image warping and the other processes required of a downstream slave unit of an LVIS system.

In all these scenarios, the significant point, as far as this invention is concerned, is that the set-top device, the last link of the video transmission chain, has significant computing power and memory. When this computing power and memory is sufficient for the viewer's set-top device to act as the downstream or "slave" section of an LVIS system, a very interesting possibility arises-the possibility to target advertising within a mass medium. In particular, it makes narrow casting of advertising possible, particularly insertions, in television and other video transmissions.

To understand the benefits of narrow casting to television and video audiences, which is the subject of this application, it is useful to understand the concepts of targeting advertising.

The most pervasive, and precise, of existing methods of narrow-casting or target advertising is direct mail (aka junk-mail) which uses mail to deliver material to selected audiences. The starting point for direct mail is a database of addresses. These databases can also be cross-linked to so called profile factors, or personal information, pertaining to the residents at each address. These profile factors are typically age, income, family composition, number of children and their ages, type of automobile owned, dwelling type, zip code and various other demographic, psychographic and life-style information. The more of these profile factors the data base contains, the more useful it is for targeting the advertising. The data base is sorted by computer to generate a mailing list of candidates whose profile factors match an advertiser selected sub-set. The advertiser believes that clients whose profile factors fall within this selected sub set will be more responsive to buying the product the advertiser is selling, so that by mailing only to those people, the advertiser (or their client) can reach all of the audience who are highly predisposed to purchase their product, with the minimum of expense.

The use of these databases has three problems. The first is that they are only effective for mail. The more influential mass media, especially television, cannot be targeted, with anything like the same geographic precision because of the broadcast nature of the transmission. The second is the problem of trying to keep the data bases up to date. Typical sources of data used to compile such data bases, such as census information, professional licensed databases, credit card transactions, warranty cards, reverse directories and consumer surveys can be months, and more typically, years out of date, leading to considerable waste and to missing a substantial fraction of potential prospects. Even good data bases only guarantee 80–90% deliverability—i.e. 10–20% of the addresses are no longer valid. The third is the concern for privacy. The existence of such centralized data bases worries many people because of their potential misuse by agencies, including but not limited to government agencies, having authorized or unauthorized access to the data bases, and also their potential use by criminals for targeting theft, con schemes and other misdeeds.

The set-top downstream version of LVIS solves all three of these problems. First, it brings the power of direct marketing to video, in particular to the mass market medium of television. Moreover, it can do this in a way that avoids the need for centralized data bases, with their privacy and out-of-date concerns. The proposed targeting mechanism of this, application, Anonymous Target Profiling, effectively targets viewers profile factors without making them publicly available in a way that ensures profile factors are close to 100% current.

SUMMARY

The invention comprises both a method and an apparatus to act as a Live Video Insertion System (LVIS), split into two functional parts, with an upstream, "master" part doing the recognition and occlusion mask generation, and sending this information downstream, along with various control parameters, to a less computationally endowed downstream "slave" part, capable of warping inserts to correctly match the current image, and correctly mixing the original video, warped insert and occlusion mask, where the downstream section is part of a set-top device in a viewer's home.

Because of the location of the set-top device at the viewer's television set, it becomes possible to narrow-cast video insertions to a single household, which may be a single person or even a particular TV set within a household. Narrow casting could be implemented as the television or video equivalent of direct mailing, in which a central, computer sorted data base is used to select viewers whose profile factors match an advertiser selected sub-set. For instance, the geographic location of set-top devices could be made extremely local by GPS type devices in the set-top device which may also double as theft protection mechanisms, or by phone numbers of attached modems, or postal codes, or by mailing addresses which are stored in the set top device, possibly as part of product warranty submissions. However, the availability of significant memory and computing power in the set-top device opens up a much more exciting possibility, which we term Anonymous Target Profiling (ATP).

Anonymous Target Profiling does not require a centralized database of all potential clients. Instead, there is a viewer usage recorder or monitor, located at the viewer location, and a viewer usage interpreter or key, supplied with the broadcast. The viewer usage recorder or monitor is a system which monitors television usage patterns and stores a continuously updated version of a usage profile. The set-top device is an ideal place to locate a viewer usage monitor. In a simple form, the viewer usage monitor would classify programs (or channels) and record a rolling viewing profile of viewing habits, including type of program watched, time of day and day of the week of viewing the program and duration of that viewing. More complex models of viewer usage may also include programs not watched, intensity of viewing (i.e. volume adjustments), surfing patterns (i.e. what video snippets arrest the attention of a channel surfer, even for a short time) and other more subtle aspects of viewer interaction with the medium.

A viewer usage interpreter is a key that translates the viewer usage profile into a set of profile factors associated with the viewing pattern. The viewer usage interpreter could be generated statistically by having a sample of households of known profile factors, who have their viewing habits monitored by a central system. By choosing the sample households scientifically so that each household in the television viewing population has a known chance of selection, the results obtained from the sample can be reliably projected to a larger television viewing audience. The sample size required for survey depends on the reliability needed. A moderate sample size is sufficient for most needs. For example, national polls, such as those conducted by the well known Gallup or Harris organizations, generally use samples of about 1,500 persons to reflect national attitudes and opinions to within an accuracy of ±4%. A sample of this size produces accurate estimates even for a country as large as the United-States with a population of over 250 million people.

In one usage of the invention, a broadcaster would establish a continuous survey of a few thousand households of known profile factors for each significant broadcast region. These surveys would be used to generate cross-correlations between viewer usage profiles and viewer profile factors. Advertisers wishing to have their advertising targeted to viewers with a particular sub-set of profile factors would be able to use the cross-correlations to translate their viewer profile requests into a viewer usage profiles request. The broadcaster would then send the required viewer usage profiles as part of the broadcast in for instance,.the vertical blanking interval (VBI) along with the advertisers insertion also in the VBI, over a number of fields, if necessary. At the viewer's set-top, the device would see which insertion was linked to the local viewer usage profile, and insert appropriately.

For instance, on a widely watched event, such as the super bowl, a car company may chose to present different models, depending on the demographic or psychographic profile of the family, based on their viewing habits. As a simple example, a family with a viewing profile that includes significant viewing of young children's programs is assumed to have children and may be shown advertisements for a mini-van, while a family with a profile that includes significant viewing of programs for out-door sports may be shown an advertisement for a sports utility vehicle made by the same company.

There could also be a "write-in" dimension to the viewing providing the viewer the opportunity to select extra specific profile factors. For instance, viewers who are looking for a car may add this fact to their viewer profile in order to deliberately solicit advertisements for cars. It may also be possible to specify price ranges and other relevant parameters.

In a further embodiment of the invention, insertions could appear as border advertisements surrounding, or partly surrounding one or more of the video windows, or could be a separate video window, which may change position, size, shape and orientation on the screen as a means of increasing the impact of the advertisement.

In another further embodiment of the invention, the set-top device could be used not only for in-programming advertising, as made possible by the LVIS system, but could use one or more secondary, possibly compressed, video channels as a source of alternate advertisements for showing in the conventional advertising breaks. These inter-program advertisements, usually coupled to events in the program, could also be at suitable breaks coupled to viewer action, such as when a viewer first turns the set on, switches channels, turns the set off, or alters viewing parameters, such as volume.

In a still further embodiment, in which the television is also connected to a computer network, such as the World Wide Web, the viewing profile could be extended to include a browsing profile, related to frequently visited web sites or other services requested. In addition, the advertising inserted could be web site addresses or other forms of links to further information, or further advertising, related to the product being advertised.

Much of the technology needed to implement the viewer usage monitor, necessary for Anonymous Target Profiling, could also be used to provide "smart" TV sets, which would favorably impact the economics of implementing the invention by allowing the set-top manufacturers or distributors to offset a substantial part of the cost of the set-top device to the end user. For example, a smart TV set, when turned on, would not just be on the channel it was on when it was turned off. Depending on the time and day of the week, it would turn on to the channel indicated most likely by the viewer usage profile, regardless of where it was when it was turned off. A smart television may also be used to provide user customized burn-ins, especially ones similar to those used by broadcasters to show baseball and football statistics. The extra channels and turners necessary for the network to offer alternate, full video to its advertisers, could also be used to have multiple windows, i.e., enhanced picture in a picture. Multiple windows would also enable the ability to turn on with predetermined setups more compelling. The warping necessary for the downstream, slave LVIS system, could be used to make one or more of these windows re-sizable, magnifyable (for people who wanted to examine some detail of the video) and even rotatable (for people who may want to lie down and have the video on its side as well). Writable digital video disks, or other high capacity, random access memory could be used by advertisers to store full motion video for insertion at the appropriate time. Such devices can also provide viewers with their own instant replay feature, automatically storing the last five or more minutes of what ever program was being watched. This feature would also make the magnification capability more compelling, especially for example to sports fans who may wish to go back and look at some aspect of play such as a ball landing close to a line in detail. Writable devices can also act as a scrap pad for grabbing bits of video they want to see later or show someone else; or as a more conventional video recorder.

These additional features may also be used as triggers for showing live or still video advertisements, either before or after the feature is used, or as a border advertisement during the use of the feature, or as a live video insertion on some recognized part of the video.

In addition to processing insertion information from a pattern recognition version of an LVIS system, the downstream, set-top part of the LVIS system could be taking insertion information from camera head sensors, including the types of systems developed for virtual studio systems, or it could be taking information from multi-user game applications.

BRIEF DESCRIPTION OF THE DRAWINGS

FIG. 4 is a schematic diagram, showing details of an alternative embodiment the end-user set-top device, enhanced to enable it to perform as the downstream, slave part of an LVIS system and to act as a smart TV.

DETAILED DESCRIPTION OF THE PREFERRED EMBODIMENT

Figure 1:
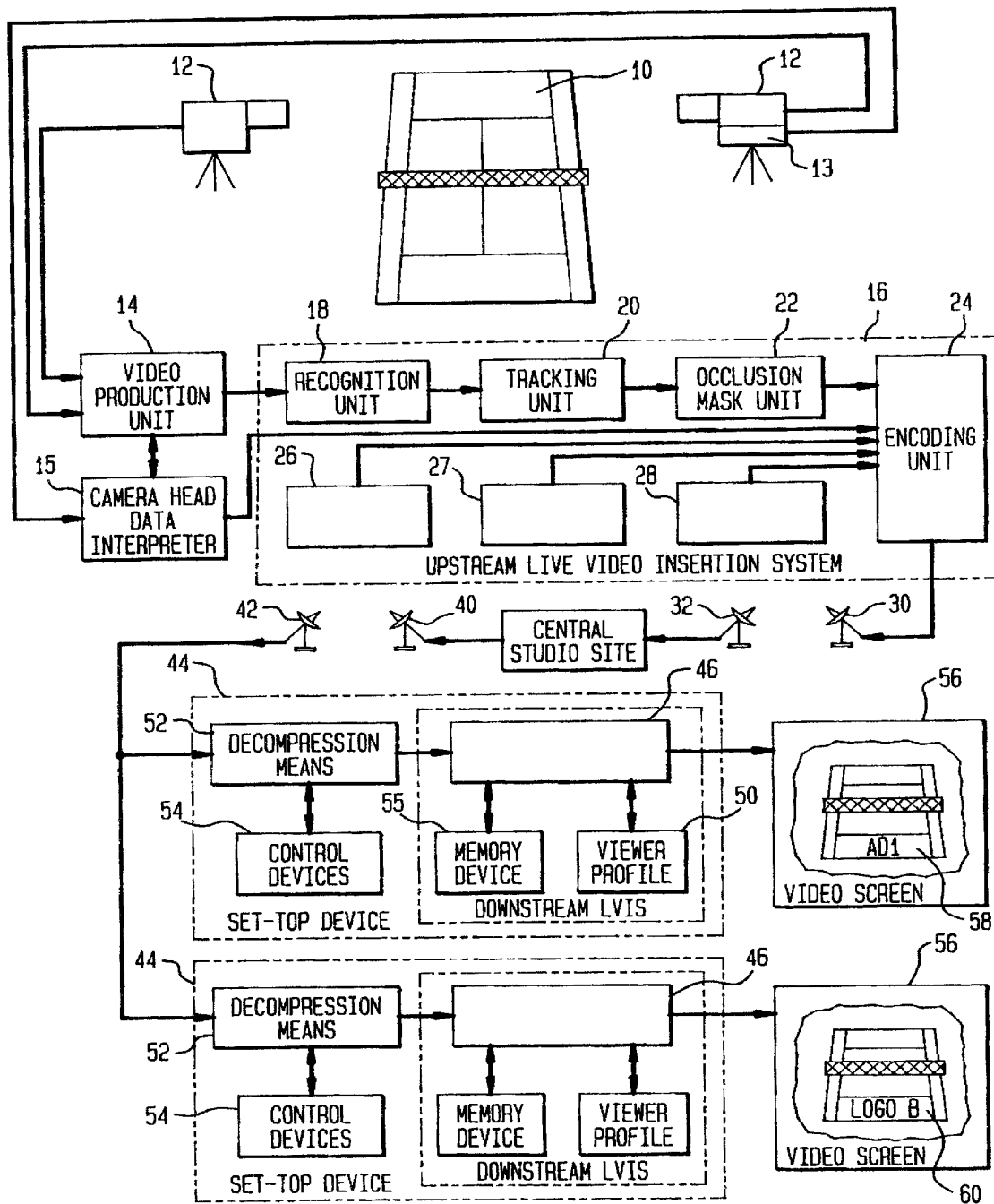
FIG. 1 is a schematic diagram showing an LVIS system split into an upstream "master" and downstream "slave system".

During the course of this description like numbers will be used to identify like elements according to the different figures which illustrate the invention.

In the preferred embodiment of the present invention, a video transmission, which may, for example, be a live television broadcast of an event being played on a court 10, is captured for remote viewing by television cameras 12, and is composed into a program for viewing within a standard video production unit 14, which may be a television production truck or a video studio, equipped with well known video production equipment. After being composed into a program, the video is fed through the front end of a Live Video Insertion System (LVIS) 16. This front end of LVIS 16 performs the initial functions of recognition using the recognition unit 18, tracking using the tracking unit 20 and occlusion mask production using the occlusion mask production unit 22, as discussed in detail in U.S. Pat. Nos. 5,264,933 and 5,543,856, as well as. co-pending patent applications: Ser. No. 08/563,598 filed Nov. 28, 1995 entitled "SYSTEM AND METHOD FOR INSERTING STATIC AND DYNAMIC IMAGES INTO A LIVE VIDEO BROADCAST"; Ser. No. 08/580,892 filed Dec. 29, 1995 entitled "METHOD OF TRACKING SCENE MOTION FOR LIVE VIDEO INSERTION SYSTEMS"; Ser. No. 08/662,089 filed Jun. 12, 1996 entitled "SYSTEM AND METHOD OF REAL-TIME INSERTIONS INTO VIDEO USING ADAPTIVE OCCLUSION WITH A SYNTHETIC COMMON REFERENCE IMAGE"; and Ser. No. 60/031, 883 filed Nov. 27, 1996 entitled "CAMERA TRACKING USING PERSISTANT, SELECTED, IMAGE TEXTURE TEMPLATES", the teachings of which are hereby included by reference.

The recognition and tracking parameters may also be provided by sensors 13 attached to the camera itself, and interpreted by a camera head data interpreter 15, as used by some virtual reality studio systems, and as discussed in detail in U.S. Provisional Application Serial No. 60/038,143 filed on Nov. 27, 1996 entitled "IMAGE INSERTION IN VIDEO STREAMS USING A COMBINATION OF PHYSICAL SENSORS AND PATTERN RECOGNITION"; the teachings of which are hereby included by reference.

However, unlike the systems discussed in U.S. Pat. No. 5,264,933, the front end LVIS system 16 does not use this information to merge the insertion with the live video. Instead an encoding unit 24 inserts the information obtained by the other parts of the LVIS front end 16 into the vertical blanking Interval of the video or other appropriate cosignal such as, but not limited to, a spare audio channel. In addition, encoding unit 24 may also insert all or any of a graphic or video for insertion 26, a program category code 27 or one or more user profile and enabling keys 28. This may be done over any number of video fields: a user enabling key (as discussed in detail of U.S. Pat. No. 5,543, 856) and one or more viewer usage profile keys 120. The output of encoder unit 24 may be a standard video signal which may be the well known standard NTSC or PAL television signals with extra information encoded in, for instance, the vertical blanking interval or an otherwise unused audio channel, or it may be such a compressed video signal.

The signal produced by the LVIS front-end 16 is sent via appropriate means 30, which may be a satellite uplink, or telephone company lines, etc., to a central studio site 34 for possible further processing before being rebroadcast to a wider audience, which may be the general public. The central facility 34 may be responsible for inserting any or all of a graphic or video for later insertion by the downstream part of the LVIS system 46, a user enabling key, one or more viewer usage profile keys, and a program category code, all for use by the downstream part of the LVIS system 46. The central studio site 34 would also be responsible for supplying conventional video advertising which may also be targeted using the Anonymous Profile Targeting methodology of this application. After appropriate alterations are made by the central studio site 34, the signal is distributed via suitable distribution means 40 and 42 which may be a satellite transmission system, a cable network, a terrestrial broadcast system, computer network or other appropriate means of transferring video or television signals to the end user, The end user has an appropriate reception device 42, which may be a cable connection, a conventional TV aerial, a satellite dish, a telephone company line or other appropriate means of receiving television or video signals. After reception, the signal is fed to a set-top device 44 before reaching the end user's video display screen 56 which may be a television screen, a computer monitor or other appropriate display medium. The set-top user may have appropriate means for decompressing 52 signals as well as other suitable control devices 54 which may perform various functions that make the set-top device desirable to the end user, such as but not limited to, customized burn-ins, automatic channel selection on power up and magnification of or re-sizing of extra viewing windows. The set-top device 44 of the preferred embodiment has, as a minimum, the components of a downstream LVIS system 46, with the ability to strip-off, interpret and use the information mixed in with the video signal by the up-stream LVIS system 16. In particular, the down stream unit 46 is able to use the information generated by the recognition unit 18, the tracking unit 20, and the occlusion mask production unit 22 to perform seamless insertion of still, animated, and live video indicia into the video stream in a way that can make the inserted indicia appear to the end user as if it were part of the original scene 10.

The set-top device 44 of the preferred embodiment is also capable of stripping off, interpreting and using any of a graphic or video, a user enabling key, one or more viewer usage profile keys 120, and a program category code, each of which may have been attached to the video stream by the encoding unit 24 or by central studio site facility 34. In particular, by comparing the viewer usage profile keys 120 with the local viewer usage profile 50, different insertions 58 and 60 may be made on different end users video viewing devices 56. The different insertions may be permanently stored locally in memory device. 55, or downloaded, there during or prior to transmission of the live video transmission in which they are inserted.

Figure 2:
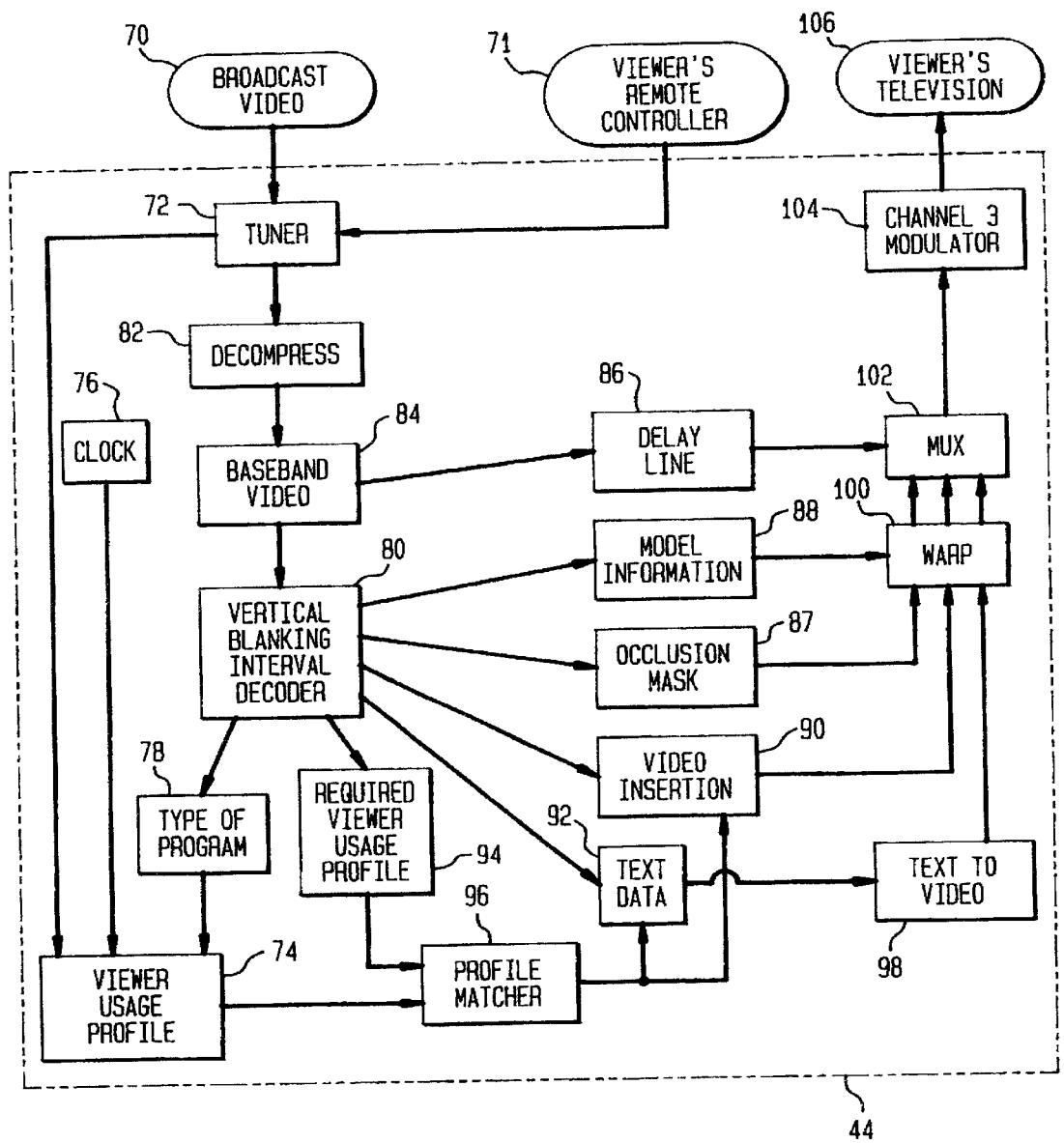
FIG. 2 is a schematic diagram, showing details of the end-user set-top device, enhanced to enable it to perform as the downstream, slave part of an LVIS system.

The end-user set-top 44 of the preferred embodiment is shown in greater detail in the schematic drawing of FIG. 2. The input data stream 70, which may be broadcast video or another suitable means of transmitting video to an end user, including but not limited to analogue or digital television broadcast, or MPEG2 or other compressed video, is typically received via a selection device 72, which may be, but is not limited to, a standard television tuner. The function of the selection device 72 is to discriminate between the variety of different video programs or data streams which may be being distributed over the same channel but on different frequency bands, or deriving from different locations on a network. In the preferred embodiment the selection device 72 is monitored by a viewer usage profile generator 74, which also has access to the current time and date via a clock 76 and to the type of program from the type of program indicator 78, which has been given this information by the vertical blanking interval decoder 80. The function of the of the usage profile generator 74 is to build up a history of the use of video viewing. The pattern of viewing, which may include type of program, nature of program being watched, time of day watching the program, day of week of watching the program, duration of watching of the program and any other relevant information pertaining to the program, can be used to predict, within acceptable margins of error, the so called profile factors which direct market advertisers currently obtain from demographic and psycho-graphic data bases.

The profile factors could be determined to different degrees of accuracy from different amounts of data. For instance, a viewing profile which only took into account time of day, day of week, time of viewing, duration of viewing, including channel surfing patterns—i.e. all data that requires no program or channel labeling—would reveal a great deal about the viewer but would leave substantial room for error. For instance, a pattern that had viewing on weekdays from 6:30 AM to 8:00 AM but nothing again until 7:00 PM to 11:00 PM, and nothing on Saturdays until after 10:00 AM, would indicate a house hold with no children, all members of which work. While this is a useful conclusion, and may be used for a degree of targeting, it does not necessarily give any indication of, for instance, the actual size of the viewing family, or the gender make-up of the family. By including monitoring of which program types were viewed, considerably more analysis is possible, with a good probability of being able to predict such important profile factors as gender, age and income.

In the preferred embodiment, the interpretation of the viewer usage profiles i.e. the cross—correlation between viewer usage profile and viewer profile factors which we have termed the viewer usage profile key would be established using well known survey sampling techniques, and practiced by such companies as the well known Gallup or Harris organizations. The viewer usage profile key could be generated by having a sample of house holds, of known profile factors, who have their viewing habits automatically monitored by a central system, which may be a computer linked into the viewers set top device by a modem and telephone link, or other appropriate technology. By choosing the sample households scientifically so that each household in the television or video viewing population has a known chance of selection, the results obtained from the sampling can be reliably projected the television or video viewing public.

Figure 3:
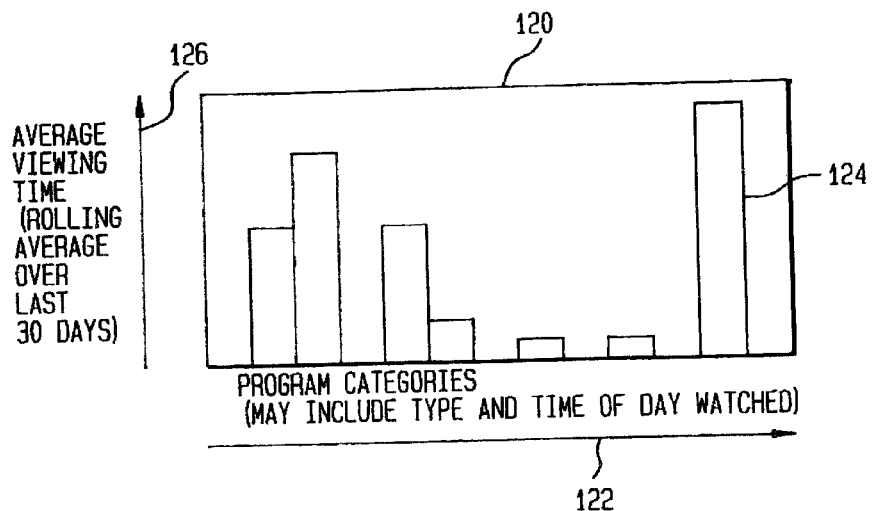
FIG. 3 shows an example of a viewer usage profile, shown as a bar chart.

The accuracy and significance of the viewer usage profile key will depend on the data used, and how it is used, to obtain viewer usage profile 120. A diagrammatic view of a viewer usage profile is shown as a bar chart in FIG. 3. Horizontal axis 122 is used to represent program category, and vertical axis 126 is used to represent a measure of viewing intensity associated with each program category. A simple form of that measure is duration of viewing of a program category. A typical entry can be represented as a bar 124. In a simple embodiment, the program categories would be time of day and day of week. For example, the first category (1, 1) may be a program shown between 12:00 midnight and 1:00 AM on Monday. The total number of categories in such a scheme could be 168, i.e., the number of hours in a week. Vertical axis 126 in this scheme would represent time spent viewing any particular category, shown graphically by the height of corresponding bar 124. In general, the program category would be a vector string, each element of the string corresponding to an attribute. Attributes could include time of day, day of week, month of year, day of year, type of program, channel of viewing, broadcaster of the video being viewed, sponsors of material being viewed, whether the program being watched was a rerun, when the program was made, where the program was made, producer of the program, major actors in the program, director of the program, or any other relevant attribute. The program category vector generally consists of three attributes the day of week, time of day, and program type.

This necessitates a coded form of the type of program being transmitted by the broadcasters, preferably in the vertical blanking interval, though it may be. on or encoded in a spare audio channel, or in the video itself, either in some spare or extra fields in for instance, the title, or opening sequence, or in the credits. The program type may be encrypted in the video itself either as a burn in or some alteration to a burn in. In a digital broadcast it may be encrypted as a least significant bit pattern, as is becoming common in digital image authentication schemes. Typical program types might include specific sports, (football, baseball, basketball, etc.) each of which may have sub-categories, such as major league, minor league, news, current affairs, film (with sub-categories).

Figure 5:
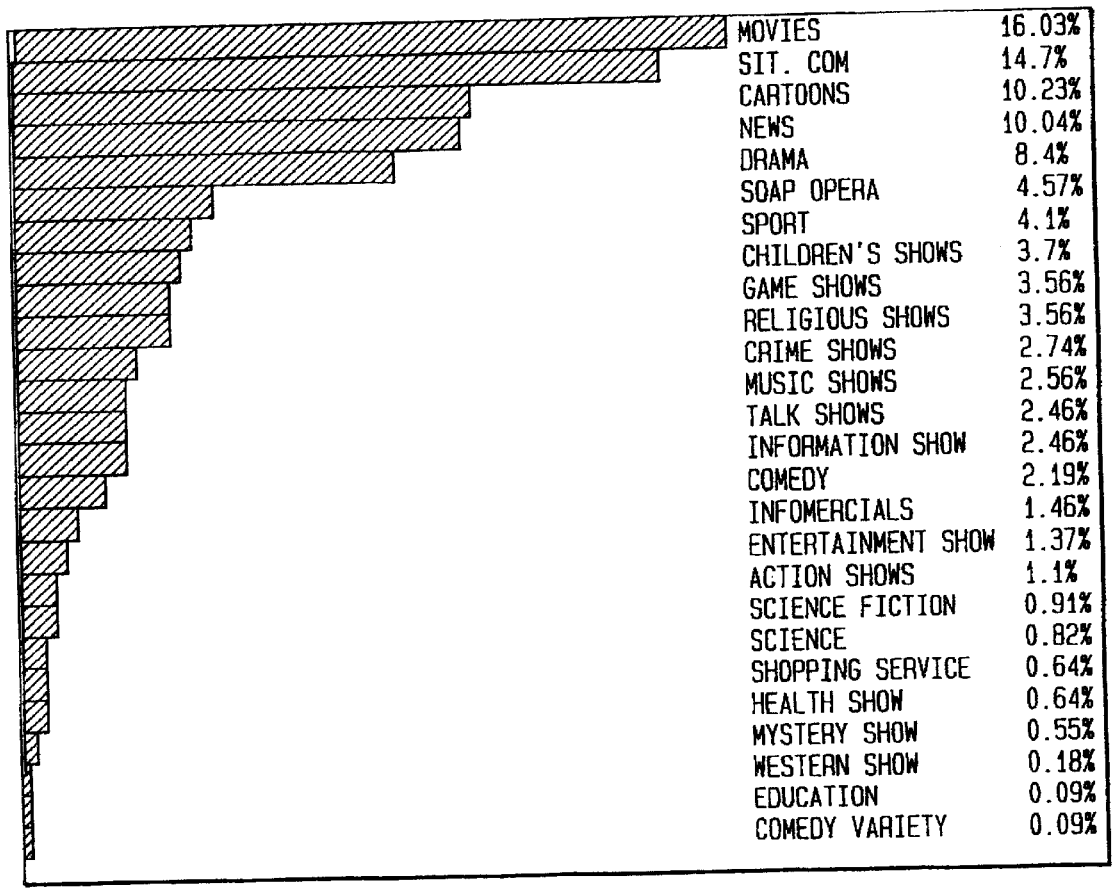
FIG. 5 is a table showing types of television programming and the percentage of total air-time within each type in one US location in a given week in 1986.

Richard F. Taflinger, Professor at the Edward R. Murrow School of Communication, Washington State University in "Sitcom: What It Is, How It Works", lists twenty-six different primary types of television shows. FIG. 5 shows a list of both these twenty-six types and the percentage of each which was available in a given week's television transmission in 1986 from an area covered by seven program providers. Professor Taflinger also notes that the average family in 1992 watched television seven hours and seventeen minutes a day, or over 50 hours a week, more than the average work week. Television is obviously a major component of American life, and because of both the diversity of viewing available, and the time spent viewing, patterns of TV viewing can be a very powerful tool for determining both demographic and psychographic make up of the viewing family. Program types could be sub-divided. One major subdivision could be whether a program was a re-run or not, and if a re-run, how recent.

Vertical axis 126 of the example viewer usage profile 120 would record the viewing intensity experience associated with each of the program categories represented by horizontal axis 122. A simple measure of viewing intensity is time spent viewing that particular program category. This may be represented as total accumulated time, the total time in the last month, or some rolling time average. Additional factors, such as but not limited to, volume, increases in volume, whether or not the set was already tuned to the channel, whether the viewer joined the program late, or whether the viewer left the program early, could be used weight the time watched to more satisfactorily generate a compound merit function or estimate of the intensity of the viewing experience associated with each of the program categories. In the preferred embodiment, viewing intensity associated with each of the program categories is simply the un-weighted, rolling average of time per week spent watching that category, with a weighting function that gives the current week unit weighting, and then systematically reduces the weighting of previous weeks. One simple way to do this is to add the previous average of each program category to the current weekly total for each program category and divide by two. Many other algorithms could be devised to achieve a similar result.

In the preferred embodiment, after leaving tuner 72, the signal goes to the de-compressor, which, if necessary does any decompressing such as, but not limited to, well known MPEG2 decompression. The output is a base-band video signal 84, which is split into two, one copy of the signal going to a delay line 86, and the other part to the vertical blanking interval decoder 80. The function of vertical blanking interval decoder 80 is to extract the information that was placed there upstream by either LVIS front-end 16 or by central studio site 34. In particular, vertical blanking interval decoder 80 extracts model information 88, occlusion mask 87, the images or videos to be inserted 90, any auxiliary text information 92 associated with the insertion, the required viewer profiles 94 associated with the different insertion videos 90, and different texts 92.

For instance, one use may be to have a single video insertion 90 of a product, but with a number of different texts 92. The default text may be in English, but for viewer usage profiles 74 that show usage of particular ethnic channels, such as Spanish language channels, the text may be in Spanish. Matching a viewer usage profile 74 of the current set-top device 44 and the required viewer usage profile 94 is done by profile matcher 96 which selects required text data 92 to be fed to text-to-video converters 98. Profile matcher 96 also selects which of the stored video insertions 90 are fed to warp unit 100. Warp unit 100 takes the appropriate model information 88 and uses it to warp the appropriate text video 98 and the appropriate video insertion 90 into the appropriate pose required to make the insertion behave as if it were part of the natural scene.

Occlusion mask 87 is also fed to a warper 89 which uses model information to warp the occlusion mask into the appropriate pose for the final video. Mixing unit 102 then combines the warped occlusion mask, the warped insertion video and text-video with base-band video 84 which has been delayed by delay line 86 for the time taken to decode and warp the images into place. The composite output of mixing device 102, which is a video signal with an insertion in place is fed into a channel modulator 104, which converts the base-band video to the form expected by the selected channel of a standard NTSC television set, as is customary. Obviously similar arrangements could be made for other television formats, such as but not limited to the well known PAL, SECAM, digital and HDTV, and other channels of the television receiver. The resultant signal is then sent to the end user's television set 106 for viewing by the end user.

An alternative, more generalized version of the set top device is shown schematically in FIG. 4. The input data stream 70 can now be one of a number of communication channels, including but not limited to, a telephone/internet connection 130, a cable video connection 132, a broadcast video aerial 134 and a satellite dish 136. Each of these data streams is selected by the appropriate selection device, including but not limited to, a modem 138, a cable modem 140, a television tuner 142 and a satellite decoder 144. Each of the selection devices is controlled via a central controller 146, which may be a programmable microprocessor, which is in turn controlled by the user, by some device such as a conventional television remote control 71, or some modified version thereof, via the viewer control interface 148. From the selection devices, the incoming signal goes either to a video and audio router 150 or a data router 152, both of which are under the control of central controller 146. The video and audio router 150 is linked to a video and audio storage device 152, which may be a well known electronic RAM memory or a well known device, such as but not limited to a writable Digital Video Disk (DVD), and a number of video and/or audio processing devices performing well known functions or operations, including, but not limited to, a decompression device 154, a video and audio mixing device 156, an occlusion mask generator 158, an video or image warper 160, and a channel modulator 162. Each of these devices is under the control of the central controller, as is the video storage device 152. The video router 150 is also linked to a video and audio interpreter 164, which is capable of extracting data embedded in, or attached to the video or audio channels, as for instance data included in the vertical blanking interval. The data router 152 has connections to a text-to-video and/or audio convertor 166, which can be fed on to the video router 150, the interpreter 164, and a data storage device 168, which is also linked to the Interpreter 164 and is under the control of the central controller 146. The central controller also has connection to the viewer usage profile store 170 and to a location information store 172 and a clock 174, which is capable of supplying time and date information. The location information store may include a well known Global Position Satellite (GPS) sensing and interpreting device.

In normal operation the viewer interacts with their television set via the remote control device 71, or other similar viewer controlled device such as but not limited to, buttons or switches on the viewer set or set top device. The viewer operations of turning the set on or off; channel selection; adjustment of parameters including, but not limited to, volume, brightness, contrast etc., and other viewer usage choices are handled by the viewer control interface 148, which may be a graphic user interface displayed on the viewers television or video display. The viewer requests are passed on to the central controller 146, which is typically a programmed micro-processor, as is well known in the art of embedded control technology.

One of the functions of the central controller is to carry out the viewer instructions by setting up the appropriate connections between all the appropriate modules within the set top device. This includes selection of the modem, cable modem, tuner or decoder as the primary receiving device; setting up of that primary receiving device to the appropriate channel, bandwidth or address to receive the data or program requested by the user; and using the data and video routers to direct the television video, audio and data signals via the appropriate storage and processing devices, including but not limited to the video and audio storage unit 152, the decompression unit 154, the video and audio mixer 156 the occlusion mask generator 158, the warper 160 and the channel modulator 162, so that the viewer ends up with the information requested, which may be a television program, or a text or image page in hyper text mark up language (HTML) or virtual reality modeling language (VRML) or other suitable protocol, from the world wide web, or some combination of such sources, displayed in the appropriate form on their end viewing device 106, which may be a television set or a computer monitor or other suitable means of displaying video or television information.

In addition, the central controller 146 is monitoring the viewer's choices by monitoring the download or interpretation devices whether they be a modem 138, a cable modem 140, a television turner 142 or a satellite decoder 144 and using the settings or mode of those devices, along with data from the clock 174, location information unit 172, viewer control interface 148, and information gleaned from interpreter 164, to build up a viewer usage profile 120 and store this in the viewer usage profile store 170. Viewer usage profile 120 stored in viewer usage profile store 170 is a measure of the temporal pattern and viewing intensity associated with each of the program categories available to the viewer and discernible by central controller 146. Typically the program categories would consist of a list or vector of attributes, where the attributes may include, but are not limited to time of day, day of week, month of year, day of year, type of program, channel of viewing, broadcaster of the video being viewed, sponsors of material being viewed, whether the program being watched was a rerun, when the program was made, where the program was made, producer of the program, major actors in the program, director of the program, or any other relevant information.

Each of these attributes may itself have a number of divisions and sub-divisions. For instance, the important attribute of type of television or video program may include, but is not limited to, such types as movies, situation comedies, cartoons, news, drama, soap operas, sport, children's shows, game shows, religious show, crime shows, music shows, talk shows, information shows, comedy, infomercials, entertainment shows, action shows, science fiction, shopping services, health shows, mystery shows, western shows and education shows. Sport may be subdivided for instance, by broad categories such as live or recorded, by continent or country of origin, or by type of sport such as, but not limited to baseball, football, hockey, basketball, tennis, soccer, rugby, cricket, bowling, track and field etc. Even the type of sport may be subdivided by such categories as amateur or professional, international or local, pre-season, regular season, or post-season, major league or minor league.

Similarly, most of the types of television or video programs could be subdivided by broad or narrow classes along lines appropriate to the specific genre of program. Although it may be possible for automated pattern recognition to recognize some of these types of programs it is assumed that most of the information regarding program type will be encrypted in or attached to the broadcast or transmission of the video or television signal upstream of the set top device.

One method would be to include a standardized code for the type of program, an appropriate part of the vertical blanking interval, or as a suitably coded part of a station identification burn in. Interpreter 164 may strip the appropriate program type information out of the video or television signal send it to the central controller for use in building up the local viewer usage profile.

Another method may be to make use of the program codes supplied by many broadcasters that allow easy programming of television sets, or simply to provide the information about what settings get what channel to the central controller.

In addition, in a statistically representative sample of the viewing population, central controller 146 would send the same information being used to compile the local viewer usage profile 170 back via the data router and one or other of the internet/telephone modem or the cable modem, back to a central collection point. At that central site, the data would be correlated and compared with databases containing demographic and psychographic information about the same statistical sample of the viewing population. Significant correlations between the viewer usage profiles and important profile factors, such as but not limited to, age, gender, income, ethnic origin, life style (e.g. married, single), taste, spending habits, credit card usage, employment status, risk taking profile, education etc. could be extracted. These correlations would provide a key for advertisers wishing to target families or individuals with particular profile factors. A significant advantage of using these correlations would be on popular shows, where a large cross-section of the population was viewing. The viewing audience could be segmented by profile factors allowing the broadcaster to sell different segments of the audience to different advertisers, even within regions covered by a single broadcast transmission device. This capability will be particularly useful to satellite providers where the transmission typically has a large geographical footprint.

One method of achieving this market segmentation by profile factor, is the following. While set-top central controller 146 is routing the viewer requested video, television or other source to the end user's set, it may also be routing alternate video or television feeds, either by different channels in the same down loader, or by different down-loader to video and audio storage unit 152 or data store 165. This alternate video feed would typically be relaying a number of different advertisements with a requested viewer usage profile or range of profiles suitably associated, attached to or encoded in, each particular advertising sequence. The contents of the alternative feed may be stored in video and audio storage unit 152. At the appropriate time and place for advertising insertion, which may be, but is not limited to, a conventional advertising break, or when the viewer changes channel, or when a particular image or scene is in view, the central controller will use video and audio router 150 and data router 152 and whichever is necessary of the other video and audio function modules, including but not limited to, video and audio storage device 152, to place an appropriate advertisement on the end user's viewing device 106. The appropriate advertisement on any given set top device would be the one where the local viewer usage profile matches or falls within the parameters of the required viewer usage profile attached to the advertisement. A default advertisement may be shown to homes where the viewer profile does not match or fall within the profiles or profile ranges requested by the advertisers targeting their advertisements to specific audiences. The required viewer usage profiles requested by the advertiser, and attached in some form to particular advertisements and insertions, may take the form of ranges of viewing intensity of one or more program categories or groups of categories, or it may be sent as a required range of ratios of the viewing intensity of one program category with respect to one or more other categories.

For instance, an advertiser may want their advertisements for a particular baby product shown only to house-holds which have a certain average viewing of both day time soap and day time children's shows but no significant viewing of sports. The reason for doing this may be because they believe that those parameters are an accurate way to target the families that are most likely to buy or use their products or services which may be, for instance, single parent mothers who have children and use live-in day care. Naturally, the same surveys used to compile the cross correlation keys would also be useful in estimating, to the same degree of accuracy, the size of the viewing population having viewer usage profiles that fit the advertisers requirements, and hence how much the advertisers should pay for their advertisements or insertions.

An alternate way of expressing the required viewer usage profile may be to show the particular advertisement or insertion only to households where the ratios of the viewing intensity of some particular program categories, or groups of categories, exceed some minimum, fall beneath some maximum or lie within some range of values. For instance, the requirement may be to only show the advertisements or insertions to the households where the ratio of average time spent viewing major league baseball to the time spent viewing situation comedies was one or greater. Or, the advertisers requirement may be that only households where the time spent watching day-time game shows was roughly equal to the time spent watching home shopping programs. The reason for requesting restriction to those house-holds would be because in the survey sample population these ratios had been found to be reliable indicators of some demographic or psychographic attribute of the viewer or viewing family that defined the advertiser's or other system user's desired audience. Program producers or broadcasters may themselves wish to use the system of Anonymous Profile targeting to present different versions of programs to different households. For instance, house-holds whose viewer usage profile indicated the presence of young children may be shown alternative versions of certain program in which either violent or sexually explicit scenes were either omitted, or had less violent or explicit scenes substituted. It may be that at different times of the year the viewer usage profiles required to reach particular demographic or psychographic attributes change.

Another function of central controller 146 may be to make the set-top device act as a downstream or "slave" section of an LVIS system. In particular central controller 146 would use the set-top device's 44 resources to strip off, interpret, and use the information attached to, or encoded in, the video or television signal by some up stream LVIS system 16. In particular, interpreter 164 would obtain information put in the video, television or data stream by recognition unit 18, tracking unit 20, occlusion mask production unit 22, and camera data interpreter 15 of the front-end or upstream LVIS system 16. The same sort of information provided by the front-end or upstream LVIS system 16 may also have been put in the video, television, or data stream by computer, as for instance, but not limited to, part of some video game, particularly multi-user video applications, or as part of a well known virtual studio set up. The LVIS information extracted by interpreter 164, may be temporarily stored in e data store 168 for use at a later, appropriate time, or used immediately to extract appropriate material from data store 168, the video and audio storage unit 152, which may be video and audio insertions, and direct it via the appropriate additional desk top functional units.

In addition, central controller 146 will use information about the required viewer usage profile attached to each proposed insert, and have compared it with viewer usage profile 120, stored in viewer usage profile store 170 to decide which insertion to use. The selected insertion is, if necessary, decompressed using video and audio decompression unit 154, before being warped to the appropriate pose by video warping unit 160. Warper 160 is fed appropriate parameters via central controller 146, which has obtained them via interpreter 164. After warping, the insertion is mixed into the video and audio stream being sent to the end user's set 106 via video and audio mixer 156. This mixing also includes an occlusion mask, which has been generated by occlusion mask generator 158, which has also received parameters supplied upstream via video and audio interpreter 164, and has also been warped into the correct pose via warper 160 using parameters supplied upstream by interpreter 164. The result is that the viewer sees an insertion on the viewing screen which appears to be part of the original video television, data broadcast, or transmission, but which has been put there by the combined action of the original upstream LVIS, or other placing mechanism, and the set-top device, and is further dependent on the local viewer usage profile or history of the viewer's usage of that particular set.

In a further embodiment, viewer usage profile 120 stored in viewer usage profile store 170 may be related to a viewer access key, or other form of identification, so that the viewer usage profile relates to a specific individual.

In a still further embodiment of the invention, viewer usage profile store 170 may be totally; or in part, located inside the viewer's remote control 71, or other related device that the viewer uses to access and control the content reaching the end user display or television set. This related control device, includes, but is not limited to, hand held computers, personal computers, joy sticks, web browsers, and other similar hardware or software modules that may be used to control the data. In addition, the view or usage profile 120 stored in the viewer usage profile is linked by access number, or other suitable identification means, to either an individual person or individual device, or module, so that profiles may be constructed and stored for those individuals or individual device or software module. In addition, an individual device or software module may construct and store viewer usage profiles 120 for a number of different individuals, who may be identified by name, password, number, or other suitable identification means, including but not limited to biometric means such as signature, fingerprint, or retina pattern.

It is to be understood that the apparatus and method of operation taught herein are illustrative of the invention. Modifications may readily be devised by those skilled in the art without departing from the spirit or scope of the invention.

What is claimed is:

1. A set-top device for sending and receiving data pertaining to television or video viewing in which a video signal having been transmitted by a video distribution mechanism is received by said device and modified prior to viewing by utilizing automatically selected video indicia or sequences which are stored locally on said set-top device, said device comprising:

means local to the user for monitoring the usage of a television or a video viewing device;

means local to the user for automatically creating a continuously updated version of a viewer profile based upon the cumulative data acquired by said monitoring means, wherein said cumulative data acquired by said monitoring means is weighted by how recently it was collected;

means local and private to the user for storing said viewer profile in said device;

means remote from the user for transmitting demographic requirements of a target viewer into corresponding ranges of viewer profiles:

means remote from the user for creating a table associating said ranges of viewer profiles with said video indicia or sequences;

means remote from the user for encoding data pertaining to where and when to insert video indicia or sequences for transmission on said video distribution mechanism;

means local to the user for receiving and decoding said video signal and receiving, decoding and storing said table;

means local to the user for receiving and decoding said data pertaining to where and when to insert said video indicia or sequences;

means local to the user for comparing the locally stored viewer profile with the ranges of viewer profiles in said stored table to determine the corresponding video indicia or sequences; and, means for inserting said video indicia or sequences directly into said video signal for viewing on said television or video viewing device, said inserting means further comprising using said data to determine where and when to insert said video indicia or sequences into said video signal.

2. The set-top device of claim 1 further comprising:

means for sampling a statistically representative sub-set of viewers to create statistical correlations between viewer demographics and said ranges of viewer profiles.

3. The set-top device of claim 2 wherein said monitoring means monitors time of day, day of week, duration of viewing time per channel, channel tuned, program type being viewed, and channel surfing patterns.

4. The set-top device of claim 3 wherein said viewer profile includes information about the viewer derived from the monitoring means, said information designed to predict the age, sex, family size, hobbies and interests of the viewer.

5. The set-top device of claim 4 wherein the statistical correlation between viewer demographics and said ranges of viewer profiles are used so that specific video sequences or indicia are anonymously targeted to specific viewer demographics.

6. The set-top device of claim 5 wherein the insertable indicia and the data pertaining to said insertable indicia are encoded into the vertical blanking interval, a spare audio channel, in the video itself, or in some other spare channel or field.

7. The set-top device of claim 5 wherein a viewer can interactively amend, change, add to, or alter the viewer profile primarily for the purpose of soliciting specific indicia.

8. The set-top device of claim 5 wherein the video signal can be a compressed video signal that is decompressed by said set-top device, or an analog or digital television broadcast.

9. The set-top device of claim 5 wherein said means for receiving includes a coaxial cable connection, television aerial connection, satellite broadcast connection, or telephone connection.

10. The set-top device of claim 5 wherein the television can be substituted with a computer or any other video reception device.

11. The set-top device of claim 10 wherein said indicia include links to Internet web-sites.

12. A set-top device for sending and receiving data pertaining to television or video viewing in which a video signal having been transmitted by a video distribution mechanism is received by said device and modified prior to viewing by utilizing automatically selected video indicia or sequences which are stored locally on said set-top device, said device comprising:

means local to the user for automatically creating a continuously updated viewer profile based upon the cumulative data acquired by said monitoring means, and wherein said cumulative data acquired by said monitoring means is weighed by how recently it was collected;

means local and private to the user for storing said viewer profile in said device;

means remote from the user for translating demographic requirements of a targeted viewer into corresponding ranges of viewer profiles;

means remote form the user for creating a table associating said ranges of viewer profiles with said video indicia or sequences;

means remote from the user for encoding said table for transmission on said video distribution mechanism;

means local to the user for receiving and decoding said video signal and receiving, decoding and storing said table;

means local to the user for comparing the locally stored viewer profile with the ranges of viewer profiles in said stored table to determine the corresponding video indicia or sequences; and, means for inserting said video indicia or sequences directly into said video signal for viewing on said television or video viewing device, and wherein said inserted indicia are interactive links to a web address, the contents of which may be accessed via the video distribution media or an associated data network and displayed on said television or video viewing device as part of said modified video signal or as a hypertext page.

13. A set-top device for sending and receiving data pertaining to television or video viewing in which a video signal having been transmitted by a video distribution mechanism is received by said device and modified prior to viewing by utilizing automatically selected video indicia or sequences which are stored locally on said set-top device, said device comprising:

means local to the user for monitoring the usage of a television or video viewing device;

means local and private to the user for automatically creating a continuously updated viewer profile based upon the cumulative data acquired by said monitoring means, wherein said means for automatically creating a viewer profile further comprises analysis of the user's accesses to web-sites when browsing the World Wide Web or other computer network.

14. A set-top device for sending and receiving data pertaining to television or video viewing in which a video signal having been transmitted by a video distribution mechanism is received by said device and modified prior to viewing by utilizing automatically selected video indicia or sequences which are stored locally on said-set top device, said device comprising:

means local to the user for monitoring the usage of a television or video viewing device;

means local to the user for automatically creating a continuously updated viewer profile based upon the cumulative data acquired by said monitoring means, wherein said cumulative data acquired by said monitoring means is weighed by how recently it was collected;

means local and private to the user for storing said viewer profile in said device;

means remote from the user for translating demographic requirements of a targeted viewer into corresponding ranges of viewer profiles;

means remote from the user for encoding said table for transmission on said video distribution mechanism;

means local to the user for receiving and decoding said video signal and receiving, decoding and storing said table;

means local to the user for comparing the locally stored viewer profile with the ranges of viewer profiles in said stored table to determine the corresponding video indicia or sequences; and, means for inserting said video indicia or sequences directly into said video signal for viewing on said television or video viewing device.

15. A set-top device for sending and receiving data pertaining to television or video viewing in which a video signal having been transmitted by a video distribution mechanism is received by said device and modified prior to viewing by utilizing automatically selected video indicia or sequences which are stored locally in said set top device, said device comprising:

means local and private to the user for monitoring the usage of a television or video viewing device;

means local to the user for automatically creating a continuously updated viewer profile based upon the cumulative data acquired by said monitoring means, wherein said viewer profile includes information about the viewer derived from the monitoring means, said information designed to predict the age, sex, family size, hobbies and interests of the view, and wherein said cumulative data acquired by said monitoring means is weighed by how recently it was collected;

means local to the user for storing said viewer profile in said device;

means remote from the user for translating demographic requirements of a targeted viewer into corresponding ranges of viewer profiles;

means remote from the user for creating a table associating said ranges of viewer profiles with said video indicia or sequences;

means remote from the user for encoding said table for transmission on said video distribution mechanism;

means local to the user for receiving and decoding said video signal and receiving, decoding and storing said table;

means local to the user for comparing the locally stored viewer profile with the ranges of viewer profiles in said stored table to determine the corresponding video indicia or sequences; and, means for inserting said video indicia or sequences directly into said video signal for viewing on said television or video viewing device.

16. A method of anonymous targeted insertion of selected indicia or sequences, which are stored locally on a set-top device, into a video broadcast comprising the steps of:

a. monitoring the usage and viewing habits of viewer of a television set or other video reception device via said set-top device located at the television set or other video reception device, said monitoring step including the step of acquiring cumulative data weighted by how recently it was collected;

b. automatically creating a continuously updated local viewer profile in said device derived from data acquired from said monitoring step, said viewer profile indicating certain characteristics of the viewer;

c. linking specific insertable indicia with specific viewer profiles;

d. encoding insertable indicia as well as data pertaining to the placement, shape, size, and perspective of the indicia directly into the video broadcast;

e. employing said locally and privately stored viewer profile to decide which insertable video indicia to insert based upon viewer profiles encoded in said video broadcast; and, f. having said set-top device decode the broadcast video and perform the insertion of the indicia.

* * * * *